(12) United States Patent
Jennings et al.

(10) Patent No.: US 8,604,965 B2
(45) Date of Patent: Dec. 10, 2013

(54) APPARATUS AND METHOD TO GENERATE AND DETECT VIRTUAL TARGETS

(75) Inventors: Richard Earl Jennings, Fredricksburg, VA (US); Thomas Lee Pagano, Egg Harbor Township, NJ (US)

(73) Assignee: Federal Aviation Administration/Department of Transportation, Washington, DC (US)

( * ) Notice: Subject to any disclaimer, the term of this patent is extended or adjusted under 35 U.S.C. 154(b) by 367 days.

(21) Appl. No.: 12/929,672

(22) Filed: Feb. 8, 2011

(65) Prior Publication Data

US 2011/0210884 A1    Sep. 1, 2011

Related U.S. Application Data

(60) Provisional application No. 61/282,535, filed on Feb. 26, 2010.

(51) Int. Cl.
| | |
|---|---|
| *G01S 7/42* | (2006.01) |
| *G01S 13/00* | (2006.01) |
| *G01S 13/74* | (2006.01) |
| *G01S 7/40* | (2006.01) |

(52) U.S. Cl.
USPC ............ 342/37; 342/13; 342/29; 342/36; 342/42; 342/159; 342/169; 342/175

(58) Field of Classification Search
USPC ............ 342/13–20, 29–51, 94–97, 159–175
See application file for complete search history.

(56) References Cited

U.S. PATENT DOCUMENTS

| | | | | |
|---|---|---|---|---|
| 3,852,747 A | * | 12/1974 | Morand ........................... | 342/15 |
| 4,309,704 A | * | 1/1982 | Anderson ........................ | 342/15 |
| 4,613,867 A | * | 9/1986 | Golinsky ........................ | 342/458 |
| 5,047,782 A | * | 9/1991 | Lew et al. ...................... | 342/169 |
| 5,153,594 A | * | 10/1992 | Moffat ........................... | 342/15 |
| 5,223,840 A | * | 6/1993 | Cronyn .......................... | 342/170 |
| 5,339,087 A | * | 8/1994 | Minarik ......................... | 342/375 |
| 5,378,155 A | * | 1/1995 | Eldridge ......................... | 434/11 |
| 5,428,530 A | * | 6/1995 | Brown et al. ..................... | 703/8 |
| 5,431,568 A | * | 7/1995 | Fey et al. .......................... | 434/2 |

(Continued)

OTHER PUBLICATIONS

Radio Technical Commission for Aeronautics (RTCA) DO-242A, Minimum Aviation System Performance Standards for Automatic Dependent Surveillance Broadcast (ADS-B), Jun. 25, 2002.

(Continued)

*Primary Examiner* — Jack W Keith
*Assistant Examiner* — Peter Bythrow
(74) *Attorney, Agent, or Firm* — James J. Drew

(57) ABSTRACT

An apparatus and method to generate and detect virtual targets. Position information for one or more virtual targets is calculated onboard a vehicle from real position information obtained from GPS satellites or other external or internal sources. This virtual position information is coded, mixed with a carrier frequency, amplified, and radiated to a nearby test vehicle, such as an aircraft. The amplitude of the radiated signal is adjusted such that the signal containing the virtual position information is received by the test aircraft only. The radiated signal thus adjusted is below the detection threshold of any aircraft further away. The test aircraft decodes the signal and interprets the decoded virtual position information as real aircraft in its vicinity. The coded signals may be structured to comply with the requirements of the FAA's ADS-B system. The apparatus may be mounted on the test aircraft itself, or on a nearby aircraft.

17 Claims, 4 Drawing Sheets

(56) References Cited

U.S. PATENT DOCUMENTS

| | | | |
|---|---|---|---|
| 5,450,329 A * | 9/1995 | Tanner | 701/467 |
| 5,457,463 A * | 10/1995 | Vencel et al. | 342/169 |
| 5,493,304 A * | 2/1996 | Lee et al. | 342/360 |
| 5,570,095 A * | 10/1996 | Drouilhet et al. | 342/357.31 |
| 5,807,109 A * | 9/1998 | Tzidon et al. | 434/35 |
| 6,067,041 A * | 5/2000 | Kaiser et al. | 342/171 |
| 6,075,480 A * | 6/2000 | Deliberis, Jr. | 342/169 |
| 6,346,909 B1 * | 2/2002 | Johnson et al. | 342/169 |
| 6,480,140 B1 * | 11/2002 | Rosefsky | 342/14 |
| 6,498,583 B1 * | 12/2002 | Tsai et al. | 342/169 |
| 6,674,391 B2 * | 1/2004 | Ruszkowski, Jr. | 342/25 R |
| 6,681,158 B2 * | 1/2004 | Griffith et al. | 701/3 |
| 6,697,008 B1 * | 2/2004 | Sternowski | 342/14 |
| 6,710,737 B1 * | 3/2004 | Cronyn | 342/174 |
| 6,744,396 B2 * | 6/2004 | Stone et al. | 342/36 |
| 6,789,016 B2 * | 9/2004 | Bayh et al. | 701/301 |
| 6,804,495 B2 * | 10/2004 | Duthie | 455/67.11 |
| 6,825,791 B2 * | 11/2004 | Sanders et al. | 342/14 |
| 6,873,893 B1 * | 3/2005 | Sanghera et al. | 701/49 |
| 6,899,540 B1 | 5/2005 | Neiderman et al. | |
| 7,002,510 B1 * | 2/2006 | Choate et al. | 342/118 |
| 7,145,504 B1 * | 12/2006 | Newberg et al. | 342/169 |
| 7,327,308 B2 * | 2/2008 | Cheng et al. | 342/165 |
| 7,365,677 B2 * | 4/2008 | Tsunoda | 342/165 |
| 7,414,567 B2 * | 8/2008 | Zhang et al. | 342/29 |
| 7,489,264 B2 * | 2/2009 | Ferm et al. | 342/14 |
| 7,532,856 B2 * | 5/2009 | Stoddard et al. | 455/1 |
| 7,852,260 B2 * | 12/2010 | Sarafian | 342/169 |
| 7,880,667 B2 * | 2/2011 | Lanzkron | 342/37 |
| 7,969,346 B2 * | 6/2011 | Franceschini et al. | 342/30 |
| 7,978,126 B2 * | 7/2011 | Tsunoda et al. | 342/165 |
| 8,223,061 B2 * | 7/2012 | Bannasch et al. | 342/14 |
| 2003/0233192 A1 * | 12/2003 | Bayh et al. | 701/301 |
| 2004/0174295 A1 * | 9/2004 | Stayton et al. | 342/182 |
| 2004/0201518 A1 * | 10/2004 | Pace et al. | 342/169 |
| 2006/0267832 A1 * | 11/2006 | Newberg et al. | 342/169 |
| 2007/0018881 A1 * | 1/2007 | King | 342/46 |
| 2007/0085730 A1 * | 4/2007 | Tsunoda | 342/165 |
| 2007/0132638 A1 * | 6/2007 | Frazier et al. | 342/455 |
| 2007/0152814 A1 * | 7/2007 | Stefani | 340/539.22 |
| 2007/0222665 A1 * | 9/2007 | Koeneman | 342/29 |
| 2007/0288132 A1 * | 12/2007 | Lam | 701/23 |
| 2008/0136701 A1 * | 6/2008 | Ferm et al. | 342/14 |
| 2008/0150784 A1 * | 6/2008 | Zhang et al. | 342/30 |
| 2009/0046002 A1 * | 2/2009 | Tsunoda et al. | 342/167 |
| 2009/0061759 A1 * | 3/2009 | Stoddard et al. | 455/1 |
| 2010/0066604 A1 * | 3/2010 | Limbaugh et al. | 342/357.03 |
| 2010/0315281 A1 * | 12/2010 | Askelson et al. | 342/30 |
| 2012/0327985 A1 * | 12/2012 | Norris | 375/221 |

OTHER PUBLICATIONS

RTCA DO-260B, Minimum Operational Performance Standards for 1090 MHz Extended Squitter Automatic Dependent Surveillance—Broadcast (ADS-B) and Traffic Information Services.

RTCA DO-282B, Minimum Operational Performance Standards for Universal Access Transceiver (UAT) Automatic Dependent Surveillance—Broadcast, Dec. 2, 2009.

RTCA, Inc., "Minimum Aviation System Performance Standards for Automatic Dependent Surveillance—Broadcast (ADS-B)"; Jun. 24, 2002; RTCA / DO-242A pp. i-xii (Table of Contents); 1-42; 69-87; 150-187.

RTCA, Inc., "Minimum Operational Performance Standards for 1090 MHz Extended Squitter, Automatic Dependent Surveillance—Broadcast (ADS-B) and Traffic Information Services—Broadcast (TIS-B)"; Dec. 2, 2009; RTCA / 260B pp. i-liv (Table of Contents); 1-47; 146-148; 162-169; 196-204; 222-224; 235-237; 243-248.

RTCA, Inc., "Minimum Operational Performance Standards for Universal Access Transceiver (UAT)—Automatic Dependent Surveillance—Broadcast (ADS-B)"; Dec. 2, 2009; RTCA / DO-282B pp. i-xxvi (Table of Contents); 1-33; 79-85; 90-102.

* cited by examiner

APPARATUS AND METHOD TO GENERATE AND DETECT VIRTUAL TARGETS

CLAIM OF BENEFIT OF PRIOR PROVISIONAL APPLICATION

This application claims the benefit of U.S. Provisional Application No. 61/282,535 filed Feb. 26, 2010.

STATEMENT OF GOVERNMENT INTEREST

The present invention may be made or used by or on behalf of the Government without the payment of any royalties thereon or therefor.

DRAWINGS

SPECIFICATION

Figure 1:
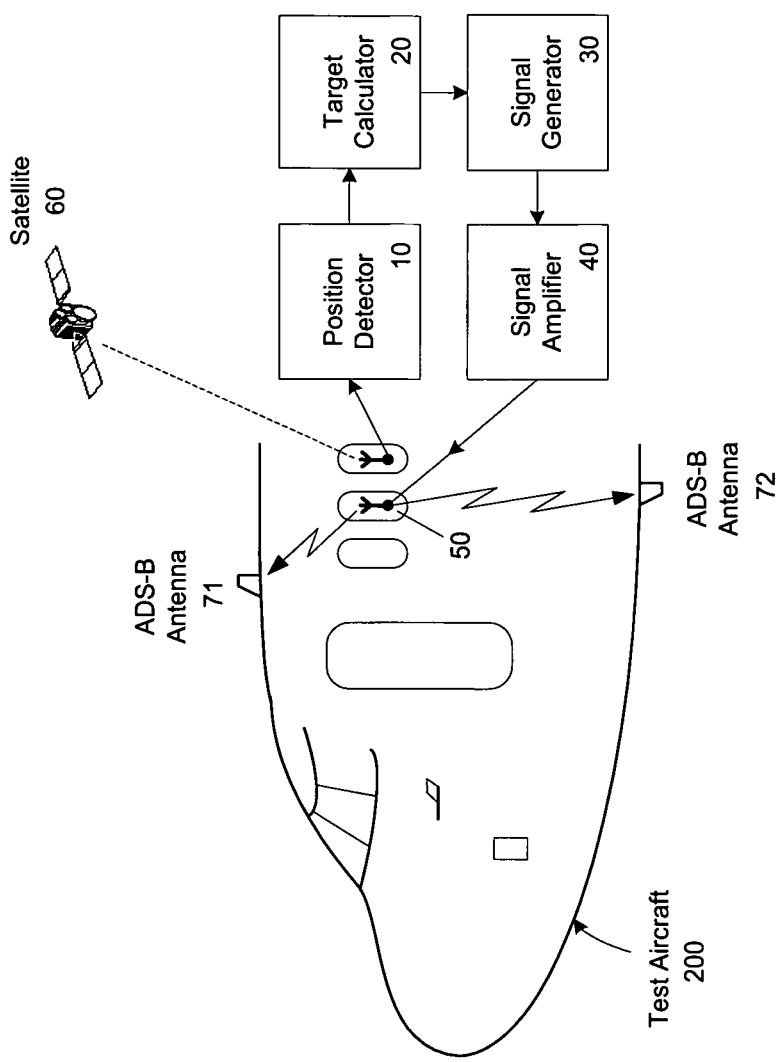
FIG. 1 is an illustration of one embodiment of the invention.

FIG. 1 illustrates one embodiment of the present invention. A position detector 10 provides position information to a target calculator 20 that uses the position information to calculate and encode virtual target information. The virtual target information is then provided to a signal generator 30 to generate electromagnetic signals that carry the virtual target information. These signals are then supplied to a signal amplifier 40 that enhances, or diminishes, the strength of these signals that are then provided to an antenna 50 for radiation. The signal amplifier adjusts the strength of the radiated electromagnetic signal carrying the virtual target information such that the radiated signals can be effectively received only over a short, predetermined distance and no further.

In FIG. 1, the position information may consist of three dimensional position data for a real object in space, for instance a test aircraft 200, enhanced by additional data such as time, altitude, latitude, longitude, velocity, acceleration, trajectory, local weather, identification, and other information that may be useful to aircraft and their operators. The position detector 10 may be a GPS receiver that receives signals from a GPS satellite constellation 60, or from multilateration techniques, or from any convenient external source.

Figure 2:
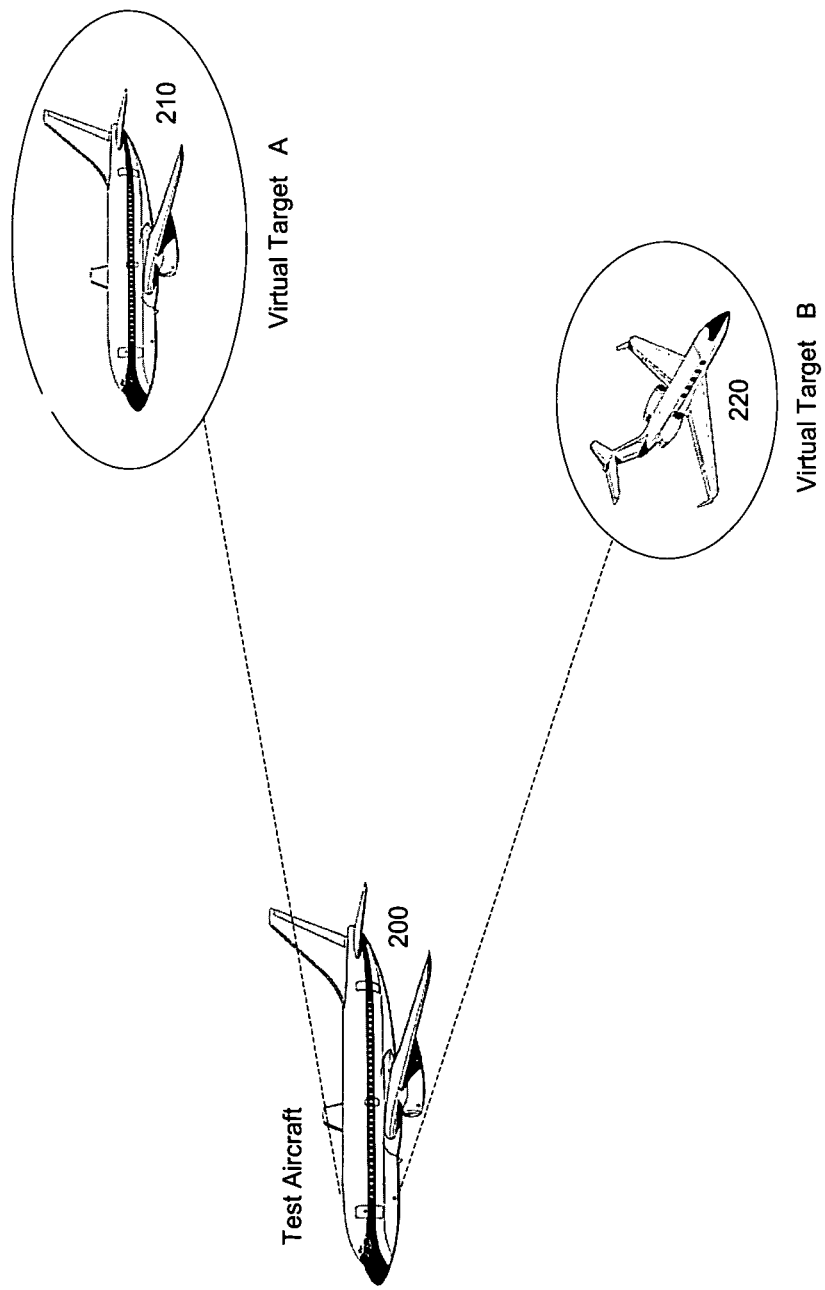
FIG. 2 is an illustration of one embodiment of the invention.
Figure 3:
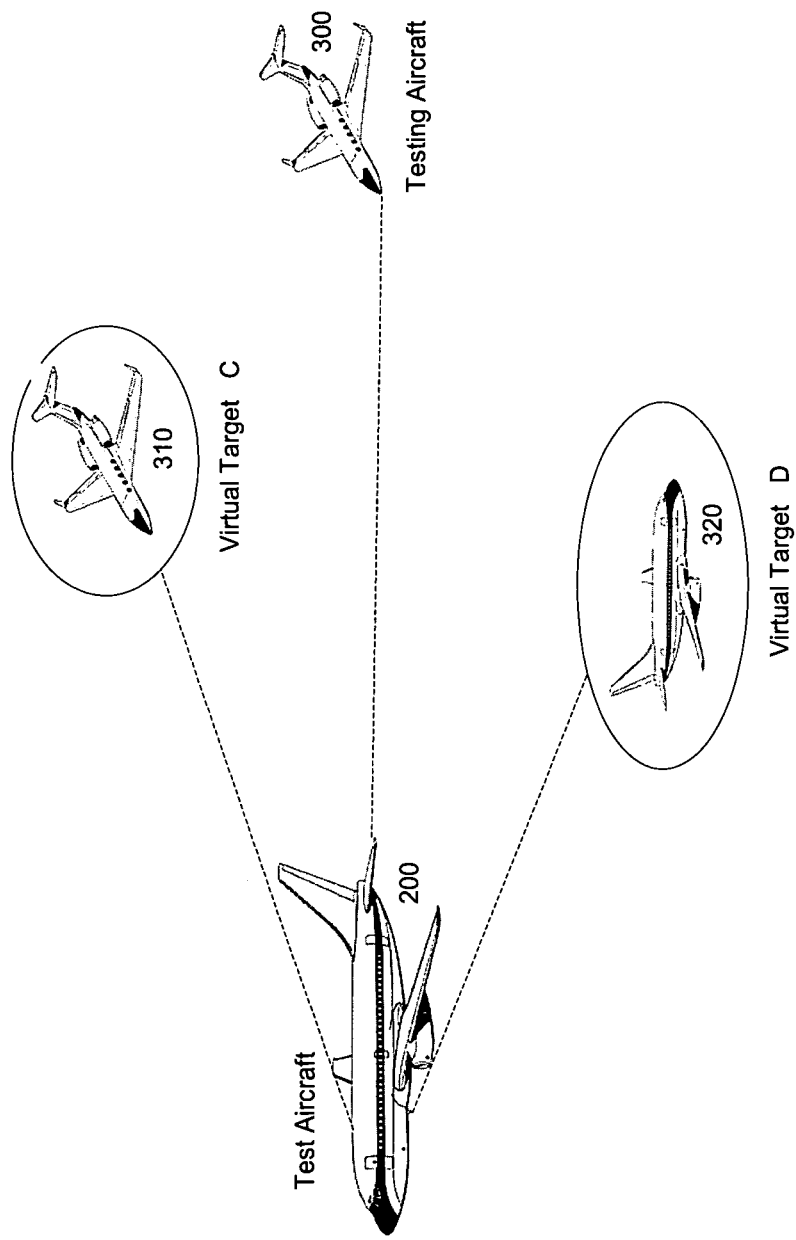
FIG. 3 is an illustration of one embodiment of the invention.

FIG. 2 shows the position detector 10, target calculator 20, signal generator 30, signal amplifier 40, and antenna 50 mounted on test aircraft 200 to generate virtual targets 210, 220 in the vicinity of the test aircraft 200, or in another embodiment shown as FIG. 3, these components may be mounted on a nearby testing aircraft 300 to test the ability of the test aircraft 200 to detect the virtual targets 310, 320. In yet another embodiment not illustrated, the testing aircraft may test the ability of other vehicles, or ground stations to detect virtual targets.

Whether mounted on the test aircraft 200 or on a nearby testing aircraft 300, the position detector 10 may also determine position information from internal positioning sources, for instance, from a flight management system, an inertial guidance device, or a ring laser gyroscope. The position detector 10 may also be an ADS-B system responsive to ADS-B positioning signals. Details of the ADS-B system and its implementation by the Federal Aviation Administration are readily available in the literature.

The target calculator 20 of FIG. 1 receives this position information and calculates virtual position information for a number of virtual, or phantom, targets. In one embodiment of the invention, the virtual position information is formatted to comply with the coding requirements established for transmission within the ADS-B system.

In adjusting the strength of ADS-B compliant RF signal such that it will reach the test aircraft only, the radiated RF signal must not be so strong as to stimulate any ADS-B systems onboard any aircraft further distant from the test aircraft 200. If nearby testing aircraft 300 is to receive the radiated RF signal, the strength of the radiated RF signal would be adjusted to not have sufficient strength to sufficiently stimulate and confuse ADS-B receivers on aircraft further away. The virtual position information produced by the target calculator 20 is used to modulate an RF signal generated by the signal generator 30 to produce a modulated signal that is compliant with the standards established for ADS-B signals. This modulated ADS-B compliant RF signal is amplified by the signal amplifier 40 and supplied to the antenna 50 for broadcast. The strength of the ADS-B compliant RF signal is adjusted to reach the ADS-B receiver, as represented by ADS-B antennae 71, 72, onboard the test aircraft 200 thus indicating to test aircraft 200 that other aircraft are in the vicinity and providing the position information for these other aircraft. The signals received by the ADS-B system onboard the test aircraft would then be whatever real aircraft are in the vicinity as well as the virtual aircraft 210, 220, FIG. 4. As shown above, the apparatus may be onboard the test aircraft 200 itself, or in a nearby testing aircraft 300. The position information received by the test aircraft 200 may or may not indicate whether any of the neighboring aircraft are virtual or real as appropriate for the test scenario. Because the strength of the ADS-B compliant RF signal has been adjusted such that it will reach the test aircraft only, no other aircraft further away will be confused by the virtual position information. The adjusted signal strength will be too weak to stimulate the ADS-B receivers onboard any local aircraft except for the test aircraft 200.

Figure 4:
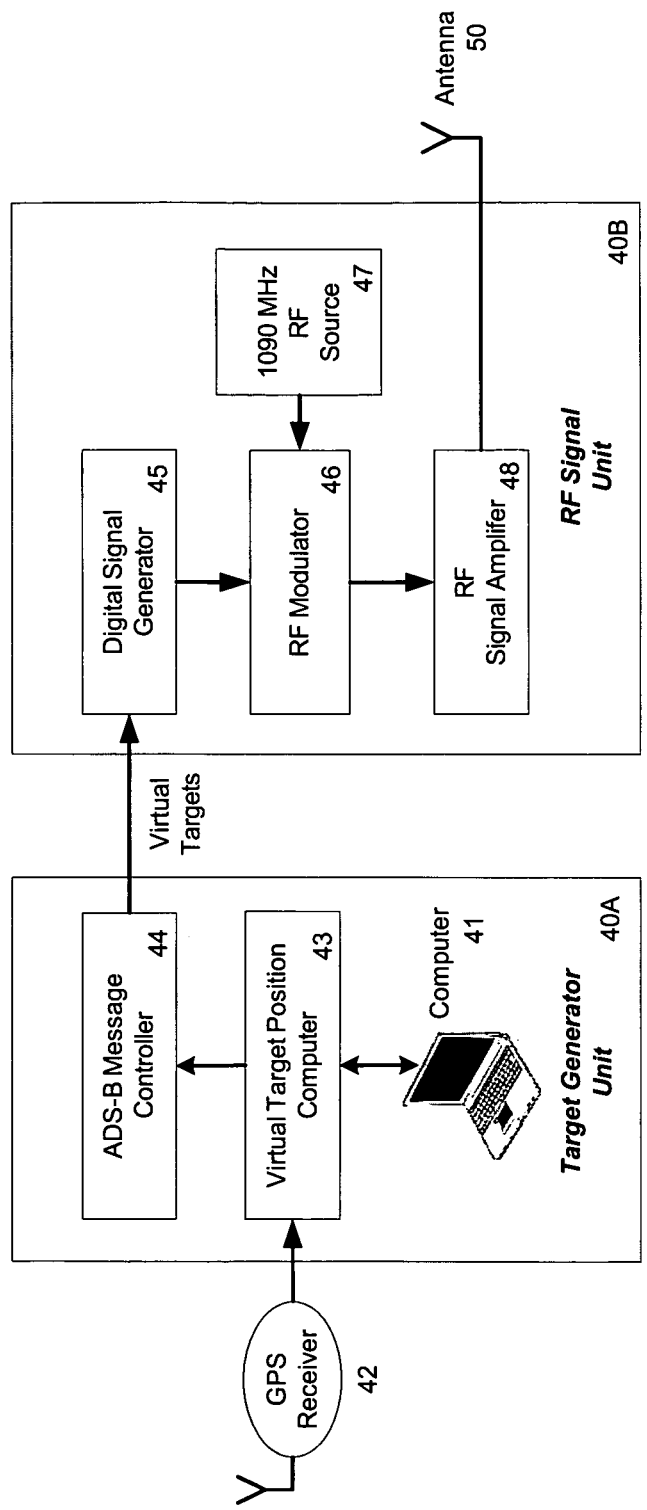
FIG. 4 is an illustration of one embodiment of the invention.

A block diagram of another embodiment of the invention is shown in FIG. 4 as the ADS-B Virtual Target Generator System, VTG 40. For the this embodiment, VTG 40 is described with reference to the 1090 Megahertz (MHz) Extended Squitter (ES) ADS-B datalink system currently used by the FAA. Specific information on this system is also readily available in the literature. The following functions and/or components of VTG 40 reside in a Target Generator Unit 40A and a Radio Frequency (RF) Signal Unit 40B, as illustrated in FIG. 4.

Electrical power to operate the VTG 40 may be obtained directly from the electrical system onboard test aircraft 200, or from an independent power source.

A GPS Receiver 42 and a Virtual Target Position Computer 43 are contained in a conventional personal computer or laptop computer 41, having a computer screen and input device, such as a keyboard, mouse, or track ball. The computer screen provides a user interface for VTG 40 and may display real time traffic along with the virtual targets relative to the test aircraft. The computer screen may also display other information useful to the viewer, such as system inputs, functions, and performance data. The input device inserts data into VTG 40 to select a specific test scenario and the required initial starting parameters (altitude, heading, velocity, etc.) of the virtually generated targets as well as dynamic control of the targets.

GPS Receiver 42 provides independent real-time position information (such as latitude, longitude, heading, and velocity) of the test aircraft 200 to allow the Virtual Target Position Computer 43 to determine a relative offset position of the virtual targets in accordance with the test scenario.

Virtual Target Position Computer 43 computes the position of the virtual aircraft that are required in the test scenario by calculating the required position (latitude, longitude, and altitude), heading, and velocity necessary to place the virtual target aircraft(s) in the space around the test aircraft in a dynamic manner based on the predetermined test scenario. For instance, the Virtual Target Position Computer 43 may take x, y, and z coordinates (or latitude, longitude, and altitude coordinates) of test aircraft 200 and create a virtual aircraft 210 located at (x+a), (y+b), and (z+c) at a common start time t. As t increases, the relative position of the virtual aircraft 210 may be held constant, or vary dynamically and independently with time. Any number of additional virtual aircraft may be created by selecting various starting parameters and trajectories.

These position data of the virtual aircraft are sent to ADS-B Message Controller 44.

In this embodiment, the GPS Receiver 42 and Virtual Target Position Computer 43 may be established in a Dell Precision M6400 laptop running a conventional operating system, such as the Emperor Linux operating system. The GPS Receiver 42 may be a PC GPS Adaptor card compatible with the computer such as the USGlobalSat BU-353 USB GPS Receiver. The Virtual Target Position Computer 43 receives position information from the GPS Receiver 42, and computes the position information, or Virtual Target Position Data, for a number of virtual targets. The position information on these virtual targets positions are computed based on a user pre-defined scenario and can also be manipulated via interactive user control of the aircraft trajectories. The Virtual Target Position Data may then be enhanced with additional data, such as the identity of the aircraft, position accuracy and integrity metrics, and other useful data. This enhanced Virtual Target Position Data is then provided by the Virtual Target Position Computer 43 to the ADS-B Message Controller 44.

ADS-B Message Controller 44 takes the computed positions from the Virtual Target Position Computer 43, and schedules the individual 1090ES messages required for each of the virtual aircraft. The ADS-B Message Controller 44 converts the enhanced Virtual Position Data into messages that conform to the requirements of ADS-B messages for each virtual target.

The ADS-B Message Controller 44 may be housed in a VME64X Chassis using a VME Processor Card such as the GE Fanuc VG5 Dual Power PC processor and operating under the Lynuxworks LynxOS RTOS 4.0 operating system and with the appropriate VME Processor Card software. The messages constructed by the ADS-B Message Controller 44 are provided to a Digital Signal Generator 45, consisting of a VME64X card within the chassis and a number of Altera MAX7000S CPLD cards that provide the following functions: diagnostic control, command latching, VME control, memory control, timing control, data shifting, and memory storage. The device performing the memory storage function may be the IDT 64Kx32 dual-port memory. Appropriate additional software to integrate these hardware and software units can be written by a computer programmer having ordinary skill in this art.

Digital Signal Generator 45 constructs the information data content of 1090 ES messages into pulse position modulated data along with preamble data pulses to satisfy the required signal characteristics of 1090 ES messages to produce a baseband signal.

The output of the Digital Signal Generator 45 is fed into RF Modulator 46 where the ADS-B compliant pulses modulate the output of a 1090 MHz RF Source 47. The output of RF Modulator 46, consisting of the 1090 carrier signal modulated by the ADS-B compliant pulses, may be digitally attenuated from −30 dBm to −111.5 dBm power at the output of the RF Modulator 47 for amplification by an RF Signal Amplifier 48, such as the Mini-Circuits ZRL-1150LN+32 dB RF amplifier.

RF Signal Amplifier 48 amplifies (or diminishes) the RF signal so that the power level is sufficient to exceed the test aircraft's own 1090 MHz ADS-B receiver's Minimum Trigger Level (MTL). The gain of RF Signal Amplifier 48 is adjustable to allow for variations in receiver MTLs and to minimize the range in which nearby aircraft would detect and decode the transmitted signals (i.e., transmitted signal levels will be detected by the test aircraft only). The amplified RF signal that contains the amplified ADS-B compliant signals for the virtual target aircraft is then provided to Antenna 50, a quarter-wave dipole designed to radiate at 1030/1090 MHz, such as the Panorama BS 1100—1.1 GHz 3 dBi whip antenna.

In a conventional aircraft, such as the Boeing 737, the signal strength at the output of Antenna 50 is expected to be about 1 mW to be detected by the ADS-B receiver of the aircraft. Other aircraft at great distances from the test aircraft do not "see" the virtual aircraft since the received signal strength from Antenna 50 is below the threshold level necessary to stimulate the ADS-B system onboard these other aircraft.

We claim:
1. An apparatus, comprising:
a) a first position detector configured to acquire real position information associated with a real vehicle and generate signal containing said first real vehicle position information; and,
b) A target calculator configured to receive said signal containing said first real vehicle position information and calculate therefrom virtual position information for at least one virtual target, encode said virtual position information into a format that is interpreted by a second position detector and generate encoded virtual position information for each of said virtual targets; and,
c) A signal generator configured to receive said encoded virtual position information for each of said virtual targets, combine said encoded virtual position information with a radio frequency carrier signal to produce a modulated RF signal; and,
d) A signal amplifier configured to receive said modulated RF signal, amplify said modulated RF signal to generate an amplified modulated RF signal containing the radio frequency carrier signal and the encoded virtual position information for each of said virtual targets; and,
e) an antenna configured to receive and then radiate said amplified modulated RF signal generated by said signal amplifier; and,
  wherein said signal amplifier is adjusted to radiate said amplified modulated RF signal by said antenna with only that strength sufficient to enable said second position detector to acquire said virtual position information.

2. The apparatus of claim 1, wherein said first position detector is a GPS receiver and said second position detector is an ADS-B receiver.

3. The apparatus of claim 1, wherein the first position detector and said second position detector are ADS-B receivers.

4. The apparatus of claim 1, wherein said first position detector and said second position detector are located on the same vehicle.

5. The apparatus of claim 1, wherein said first position detector and said second position detector are located on separate vehicles.

6. The apparatus of claim 2, wherein said first position detector and said second position detector are located on the same vehicle.

7. The apparatus of claim 2, wherein said first position detector and said second position detector are located on separate vehicles.

8. The apparatus of claim 3, wherein said first position detector and said second position detector are located on the same vehicle.

9. The apparatus of claim 3, wherein said first position detector and said second position detector are located on separate vehicles.

10. A method of generating and detecting virtual targets
   (a) wherein a first GPS receiver located on a first real vehicle performs the step of acquiring real position information associated with said first real vehicle; and,
   (b) wherein a Virtual Target Generator performs the steps of:
   (b1) calculating virtual position information based on said real position information for at least one virtual target; and,
   (b2) encoding said virtual position information into a format that may be decoded; and,
   (b3) combining said encoded virtual position information with an RF carrier frequency to produce a modulated RF signal containing said encoded virtual position information; and,
   (b4) adjusting the amplitude of said modulated RF signal; and
   (b5) providing said modulated RF signal to an antenna; and,
   (c) wherein said antenna performs the step of radiating said modulated RF signal with only that signal strength, as determined by adjusting the amplitude of said modulated RF signal, sufficient to be acquired by a second GPS receiver located on a second real vehicle; and,
   (d) wherein said second GPS receiver performs the step of decoding said modulated RF signal to produce virtual position information for said virtual targets such that said second real vehicle detects said virtual targets.

11. The method of claim 10, wherein said encoded virtual position information is compliant with the requirements of ADS-B.

12. The method of claim 10, wherein said first real vehicle and said second real vehicle are separate vehicles.

13. The method of claim 10, wherein said first real vehicle and said second real vehicle are the same vehicle.

14. The method of claim 11, wherein said first real vehicle and said second real vehicle are separate vehicles.

15. The method of claim 11, wherein said first real vehicle and said second real vehicle are the same vehicle.

16. An apparatus to generate and detect virtual targets comprising:
   a) a GPS receiver configured to acquire real position information associated with a first real aircraft and generate a signal containing said first real aircraft position information, and
   b) a virtual target position computer configured to receive said signal containing said first real aircraft position information, calculate for at least one virtual aircraft, virtual aircraft position information derived from said first real aircraft real aircraft position information, and generate a signal containing said virtual aircraft position information, and
   c) an ADS-B message controller configured to receive said signal containing virtual aircraft position information associated with each of said virtual aircraft, schedule the individual 1090 ES messages required for each of the said virtual aircraft, and convert the said virtual aircraft position information associated with each of said virtual aircraft into signals that conform to the requirements of ADS-B messages, and
   d) a digital signal generator configured to receive said signals provided by said ADS-B message controller, construct said signals provided by said ADS-B message controller into pulse position modulated data along with preamble data pulses to satisfy the required signal characteristics of 1090 ES messages to produce a baseband signal, and
   e) an RF modulator configured to receive said baseband signal and combine said baseband signal with a 1090 MHz RF carrier signal to produce a modulated baseband signal containing the virtual aircraft position information converted into signals that conform to ADS-B messages, and
   f) an RF signal amplifier configured to receive said modulated baseband signal and amplify said modulated baseband signal, and
   g) an antenna configured to receive the amplified modulated baseband signal and then radiate said amplified modulated baseband signal, and
     wherein said RF signal amplifier amplifies said modulated baseband signal only to that amplitude that the radiated amplified modulated baseband signal reaches an ADS-B receiver located on said first real aircraft.

17. An apparatus to generate and detect virtual targets comprising:
   a) a GPS receiver configured to acquire real position information associated with a first real aircraft and generate a signal containing said first real aircraft position information, and
   b) a virtual target position computer configured to receive said signal containing said first real aircraft position information, calculate for at least one virtual aircraft, virtual aircraft position information derived from said first real aircraft real aircraft position information, and generate a signal containing said virtual aircraft position information, and
   c) an ADS-B message controller configured to receive said signal containing virtual aircraft position information associated with each of said virtual aircraft, schedule the individual 1090 ES messages required for each of the said virtual aircraft, and convert the said virtual aircraft position information associated with each of said virtual aircraft into signals that conform to the requirements of ADS-B messages, and
   d) a digital signal generator configured to receive said signals provided by said ADS-B message controller, construct said signals provided by said ADS-B message controller into pulse position modulated data along with preamble data pulses to satisfy the required signal characteristics of 1090 ES messages to produce a baseband signal, and e) an RF modulator configured to receive said baseband signal and combine said baseband signal with a 1090 MHz RF carrier signal to produce a modulated baseband signal containing the virtual aircraft position information converted into signals that conform to ADS-B messages, and f) an RF signal amplifier configured to receive said modulated baseband signal and amplify said modulated baseband signal, and g) an antenna configured to receive the amplified modulated baseband signal and then radiate said amplified modulated baseband signal, and wherein said RF signal amplifier amplifies said modulated baseband signal only to that amplitude that the radiated amplified modulated baseband signal reaches an ADS-B receiver located on a separate real aircraft.

\* \* \* \* \*